United States Patent

[11] 3,597,017

| [72] | Inventors | Kenzo Tanaka;<br>Yutaka Masaoka, both of Shizuoka-ken, Japan |
|---|---|---|
| [21] | Appl. No. | 824,629 |
| [22] | Filed | May 14, 1969 |
| [45] | Patented | Aug. 3, 1971 |
| [73] | Assignee | Yamaha Hatsudoki Kabushiki Kaisha<br>Hamakita-shi, Shizuoka-ken, Japan |
| [32] | Priority | May 14, 1968, May 18, 1968 |
| [33] | | Japan |
| [31] | | 43/39462, 43/40726 |

[54] DEVICE FOR TENSIONING AN ENDLESS TRACK BELT
5 Claims, 5 Drawing Figs.

[52] U.S. Cl. .................................................. 305/32, 180/5
[51] Int. Cl. ...................................................... B62m 27/02, B62d 55/30
[50] Field of Search .......................................... 180/5, 9, 24; 305/27, 31, 32

[56] References Cited
UNITED STATES PATENTS

| 2,011,583 | 8/1935 | Knox | 305/31 X |
| 3,489,234 | 1/1970 | Lorenz | 305/32 |
| 3,510,174 | 5/1970 | Lamb | 180/5 X |
| 3,480,096 | 11/1969 | Hammitt | 180/5 |

OTHER REFERENCES
" Popular Mechanics," Oct. 1967, pages 138— 139

Primary Examiner—Richard J. Johnson
Attorney—Irving M. Weiner

ABSTRACT: A tensioning device comprises a bracket attached to the frame of an endless-belt traction vehicle and provided with a slit extending in the lengthwise direction thereof, a pivoting member adjustably secured to the bracket with its body partly inserted into said slit, and means for setting said pivoting member in place by moving said pivoting member along the length of said slit. Said pivoting member extends in a direction perpendicular to the length of said slit and rotatably supports a rear arm for rotatably bearing the rear axle of a wheel or wheels over which the endless track belt is stretched.

PATENTED AUG 3 1971

3,597,017

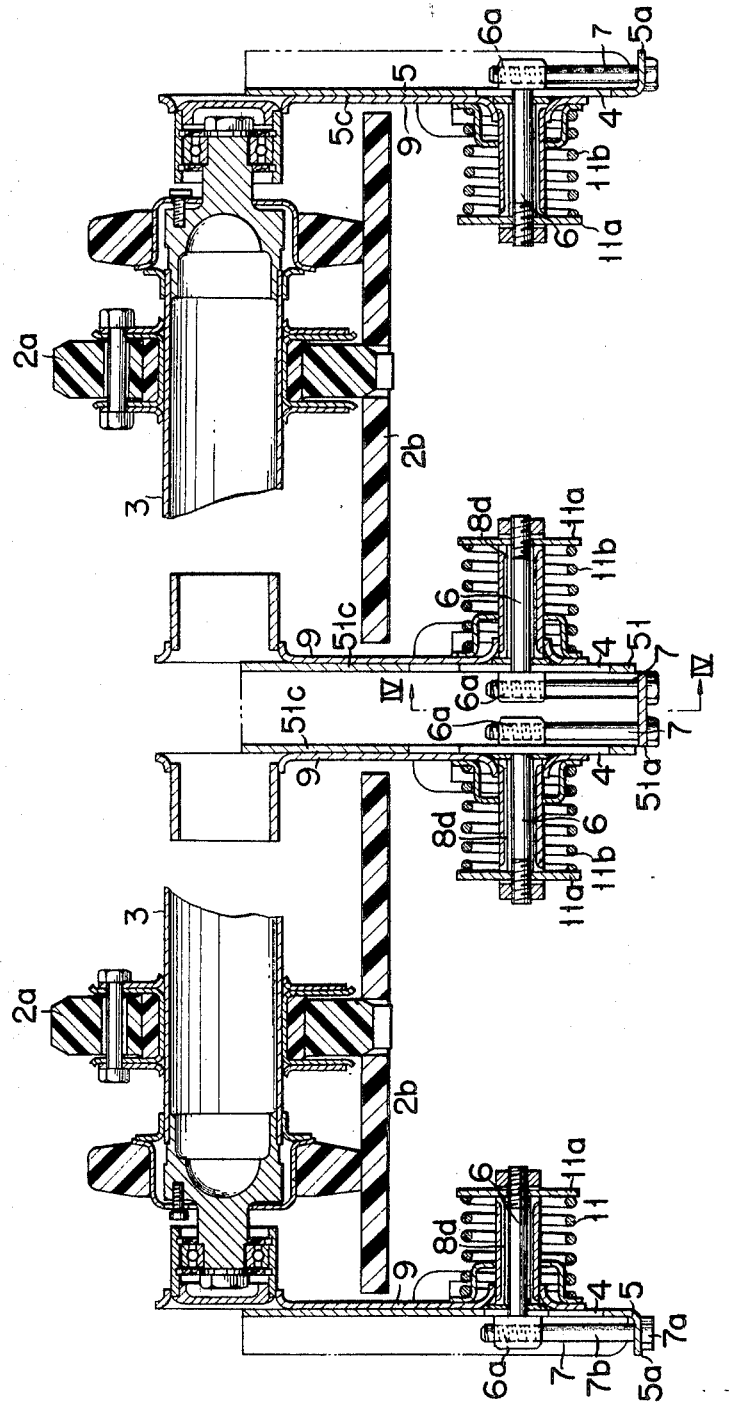

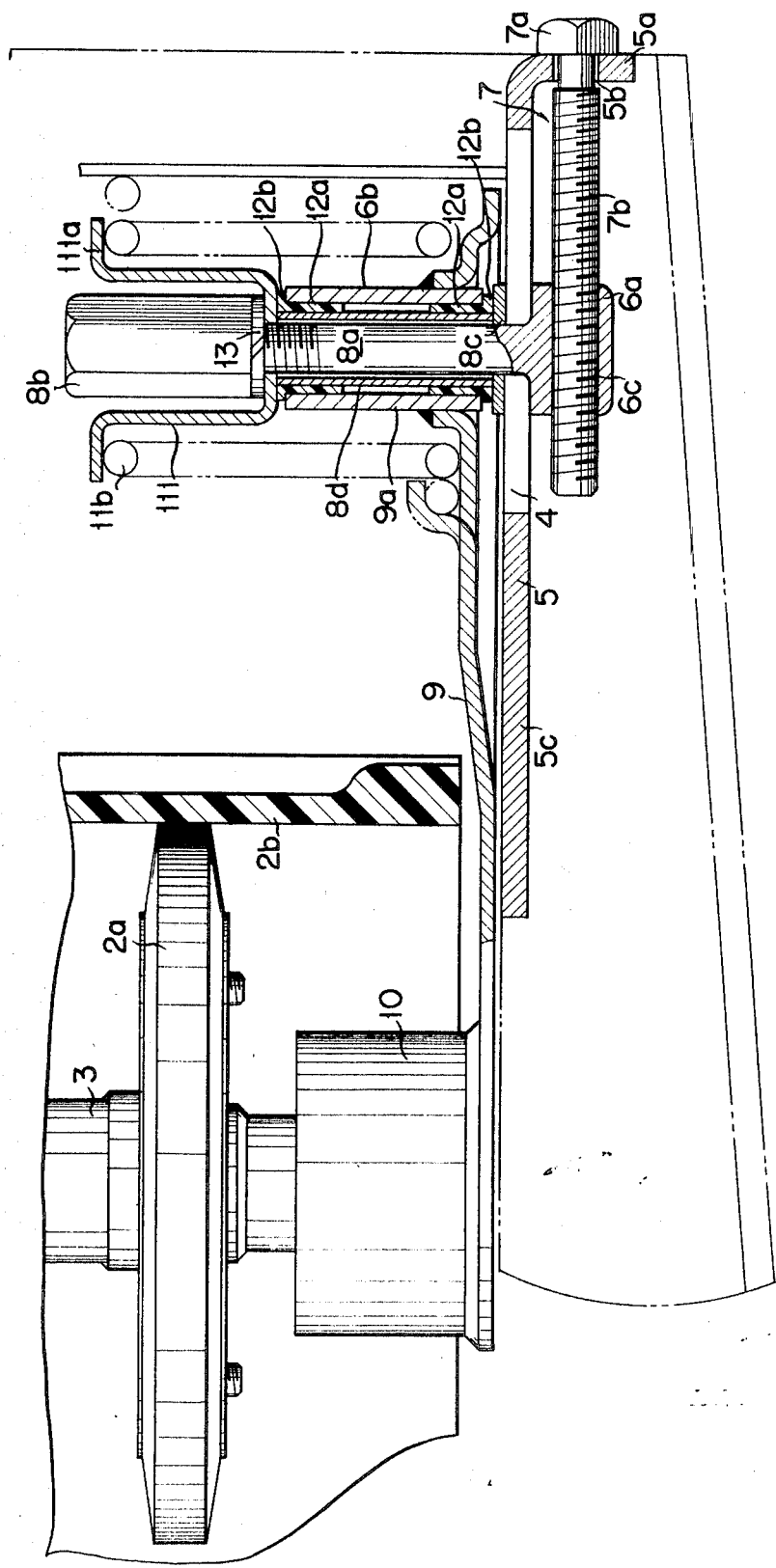

DEVICE FOR TENSIONING AN ENDLESS TRACK BELT

BACKGROUND OF THE INVENTION

This invention relates to a device for tensioning an endless track belt used in an endless-belt traction vehicle and more particularly in a small size endless-belt traction snow vehicle.

The prior art device for tensioning an endless track belt having a pivoting member extending in a direction perpendicular to the length of a vehicle frame and rotatably supporting a rear arm, and a member for supporting said pivoting member. Said supporting member was provided with at least two linearly arranged bores each extending in the lengthwise direction of said vehicle frame, and attached to the bottom of a step plate formed with said vehicle frame, with its bores transversed by bolts vertically set on said step plate, adjustably with respect to the lengthwise direction of said bores. In order to slide the bolt in the bore with ease, there was formed a slight gap between the inner wall of the bore and the peripheral surface of the bolt.

Accordingly, it was difficult exactly to position the pivoting member in a parallel direction to the rear axle of a wheel or wheels rotatably carried at the front end of the rear arm, when the supporting member is attached to the bottom of said step plate by nutting said bolts, causing disorder in alignment of the bearing equipped on the pivoting member so as rotatably to support the rear arm. Furthermore, the length of said bore was insufficient to adjust the position of the rear arm, pivoted to the pivoting member, to the respect of the lengthwise direction of the vehicle frame so that an endless track belt may sufficiently be stretched even if it is manufactured with its length defined in lack of unity or its length is increased during its age deforming.

SUMMARY OF THE INVENTION

An object of this invention is to provide an improved device for tensioning an endless track belt so as to eliminate the above-mentioned defects of the prior art and easily to adjust the setting of a pivoting member in place. The tensioning device of this invention comprises a bracket which is attached to the rear portion of a vehicle frame and has a vertical wall provided with a slit extending in the lengthwise direction of said vehicle frame; a pivoting member having a head engageable with one surface of said vertical wall and a body passing through said slit at a right angle; an adjusting member which is supported by the vehicle frame and adjusts the position of said pivoting member along said slit; means for rigidly attaching said head of said pivoting member to said vertical wall and including a threaded portion formed at the end portion of said body of the pivoting member, a nut adjustably screwed to said threaded portion, a washer fitted to said body of the pivoting member and engageable with the other surface of said vertical wall and a hollow spacer into which said body of the pivoting member is inserted and clamped between said nut and said washer; a rear arm pivoted on said pivoting member by said hollow spacer and rotatably bearing at its free end a rear axle of at least one wheel over which an endless track belt is stretched; and means for urging said rear arm to force said rear axle downward.

BRIEF EXPLANATION OF THE DRAWINGS

FIG. 2 is a cross-sectional view of said snow vehicle taken along a line II-II of FIG. 1;

FIG. 5 is a horizontally cross-sectional view of the enlarged main part of a snow vehicle of the same type as that indicated in FIGS. 1 to 4, in which there is included a partly different tensioning device from that of the above-mentioned figures.

DESCRIPTION OF THE PREFERRED EMBODIMENTS

Figure 1:
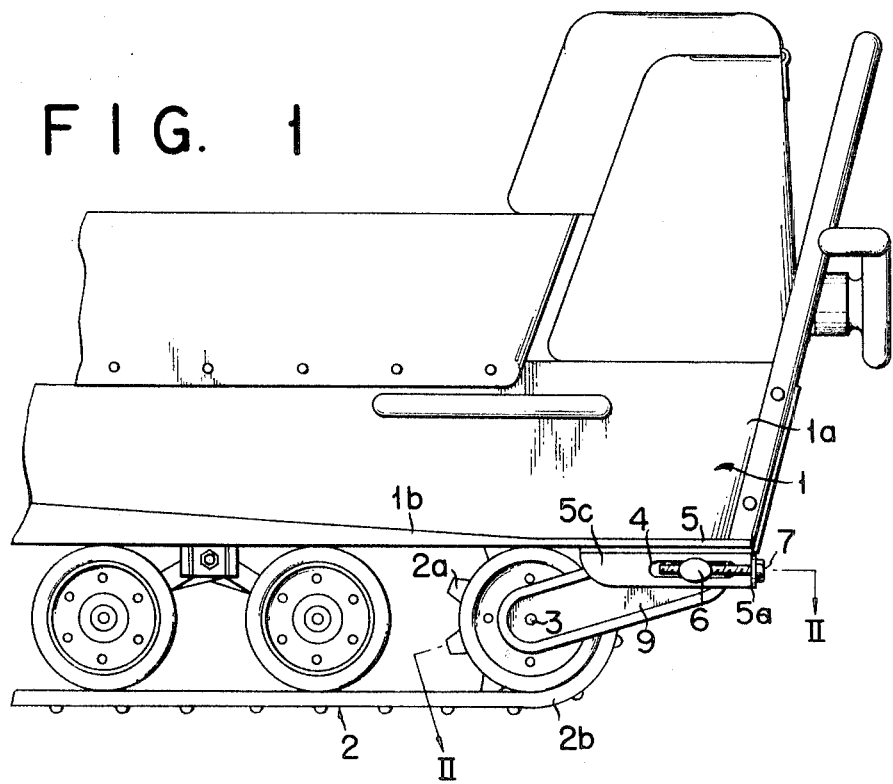
FIG. 1 is a side view of an endless-belt traction snow vehicle having a device for tensioning an endless track belt embodying this invention.
Figure 4:
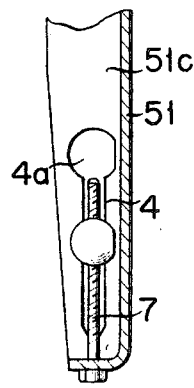
FIG. 4 is an elevational view of a part of the snow vehicle shown along a line IV-IV of FIG. 2.
Figure 3:
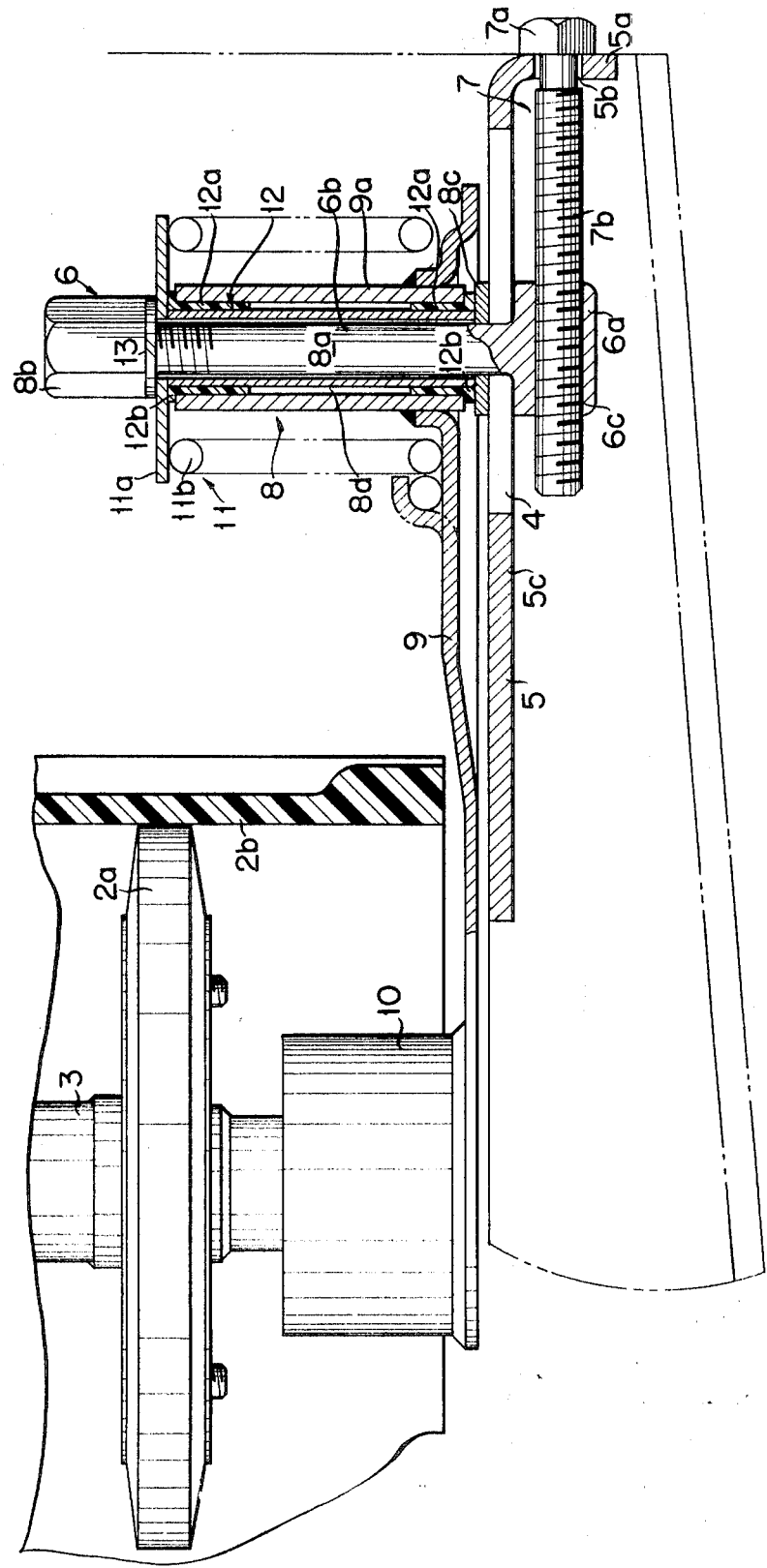
FIG. 3 is a horizontally cross-sectional view of the enlarged main part of said snow vehicle.

An endless-belt traction vehicle indicated in FIGS. 1 to 5 involves a vehicle body or frame 1 carried on an endless-belt traction means 2. Said vehicle frame 1 comprises an inverted channel-shaped member 1a and two step plates 1b integrally formed with said member 1a in a manner to protrude from the lower edges of the vertical sidewalls of said member 1a outwardly. Said traction means 2 involves two driving sprocket wheels (not shown) journaled on said vehicle frame 1 at the front side, two driven sprocket wheels 2a secured to a rear axle 3 extending in the transverse direction of said vehicle body 1, and two endless track belts 2b stretched over the driving and driven sprocket wheels, respectively.

The essential part of this invention is a device for tensioning said endless track belt 2b. Said tensioning device comprises a slit 4 formed in the vertical wall 5c or 51c of a bracket 5 or 51 in a manner to extend in the lengthwise direction of the vehicle body 1; a pivoting member 6 having a head 6a fixed to the vertical wall 5c or 51c said bracket 5 or 51 through said slit 4, a body 6b of a columnar type passing through said slit 4 and extending in a direction perpendicular to the length of said slit 4, and a threaded bore 6c formed in said head 6a in perpendicular to the axis of said body 6b in parallel with said slit 4; and an adjusting member 7 supported by a portion 5a or 51a protruding from the rear end of said bracket 5 or 51 outwardly in such a manner that its movement restrained in a parallel direction to the length of said slit 4, though movable around its axis. Said adjusting member 7 preferably consists of a bolt having a head 7a and a threaded portion 7b passing through a bore 5b formed in said protrusion 5a or 51a and extending in a parallel direction to the length of said slit 4. Said threaded portion 7b is rotatably screwed to said threaded bore 6c. Said frame 5 is angle-shaped and attached to the bottom of the rear end portion of said step plate 1b arranged along each side of said vehicle frame 1. On the other hand, said bracket 51 is inverted channel-shaped and attached to the bottom of the rear end portion of a longitudinal member which is inverted hat-shaped in its cross section and rigidly secured to the inner surface of the member 1a along the centerline thereof.

Said tensioning device further comprises means 8 for rigidly attaching said head 6a to the bracket 5 or 51 through said slit 4; and a rear arm 9 for rotatably bearing at its free end the rear axle 3 by means of a bearing 10 attached at its free end, said rear arm 9 being pivoted on said pivoting member 6 and biased so that said rear axle 3 if forced downwardly. A boss 9a of one end of said rear 9 is positioned around said pivoting member 6, i.e. the body 6b, said attaching means 8 is disposed on said pivoting member 6.

In this embodiment, said attaching means 8 includes a threaded portion 8a formed at the end portion of said pivoting member body 6b, a nut 8b adjustably screwed to said threaded portion 8a, a washer 8c fitted to said pivoting member body 6b and placed on the side of the attached frame 5 or 51 opposed to the side on which said head is disposed, a hollow cylindrical spacer 8d into which the pivoting member body 6b is inserted and which is clamped between the nut 8b and washer 8c so that said rear arm 9 is pivoted on said pivoting member 6 by the medium of said spacer 8d. There is further provided a sliding bearing member 12 which, in the embodiment, consists of two hollow cylinders 12a of ice-repellent and friction free-plastics material such as poliamide resin or polyacetal resin coaxially arranged to each other and interposed between the hollow spaced 8d and the boss 9a of the rear arm 9 in a manner to surround the pivoting member body 6b. Said cylinders 12a are provided with annular flanges 12b interposed between the ends of the boss 9a and washer 8c and the ends of the boss 9a and a supporting member described hereinafter. Said boss 9a of the rear arm 9 may be fabricated by a hollow cylinder welded to the body of said rear arm.

Said supporting member is indicated by the reference numeral 11a and included in the urging means 11. Said urging means 11 further has a torsional coiled spring 11a surrounding said pivoting member body 6b, one end of said spring 11b being attached to said vehicle frame, and the other end thereof being attached to said rear arm 9. Said supporting member 11a is preferably rigidly secured between the end of the hollow spacer 8d and a spring washer 13 by progressively screwing the nut 8b into the threaded portion 8a. Said supporting member 11a preferably has a bore transversed by said pivoting member body 6b.

As shown in FIG. 5, said supporting member, if necessary, may be fabricated by a hat-shaped member 111 with an annular flange 111a which is specifically formed by having a length defined between a point at which the supporting member is secured to the pivoting member body 6b, and a point at which the end of the spring member 11b is in contact with said supporting member, with respect to the lengthwise direction of said spring member 11b.

In the endless-belt traction vehicle of this embodiment having two parallel arranged endless-belt traction means, it is necessary for utilizing the endless track belts as broad as possible, whereby the areas of said belts attaching to the ground are increased so as to improve the efficiency of running of the vehicle, to have a narrow space defined between the walls 51c of the inverted channel-shaped brackets 51 positioned at the center of the vehicle frame, each of the walls, 51c of said attached bracket 51 being adapted to correspond to each of sets of the tensioning devices of the same type as that as detailed above.

For such requirement, the slit 4 formed in the inside attached bracket 51 has an aperture 4a formed at the forward end thereof, said aperture 4a having such a size as to allow the head 6a of the pivoting member 6 to pass through said aperture. As a result, the pivoting member 6 can be easily attached to the wall 51c of the bracket 51 from the outerside or side at which the rear arm 9 exists.

This embodiment indicates such a condition that the rear axle is carried by four cooperating rear arms. Further, the tensioning device of this invention, though used in the endless-belt traction vehicle having two parallel arranged track belts, may also be used in a vehicle having a single track belt.

We claim:

1. A device for tensioning an endless track belt of a vehicle comprising:

a. a bracket attached to the rear portion of a frame of said vehicle and having a vertical wall provided with a slit extending in the lengthwise direction of said frame;
    b. a pivoting member having a head engageable with one surface of said vertical wall and a body passing through said slit at a right angle:
    c. an adjusting member supported by the vehicle frame and adjusting the position of said pivoting member along said slit;
    d. means for rigidly attaching said head of said pivoting member to said vertical wall, said attaching means including a threaded portion formed at the end portion of said body of the pivoting member a nut adjustably screwed to said threaded portion, a washer fitted to said body of the pivoting member and engageable with the other surface of said vertical wall and hollow spacer into which said body of the pivoting member is inserted and clamped between said nut and said washer;
    e. a rear arm for rotatably bearing at its free end a rear axle of at least one wheel over which an endless track belt is stretched, said rear arm being pivoted on said pivoting member by said hollow spacer; and
    f. means for urging said rear arm to force said rear axle downward.

2. A device characterized substantially in accordance with claim 1, in which there is provided a sliding bearing member consisting of at least one hollow cylinder of ice-repellent and frictionless plastic material interposed between said hollow spacer and a boss of said rear arm.

3. A device characterized substantially in accordance with claim 1, in which said slit includes an aperture formed at the forward end thereof, said aperture having such a size as to allow the head of the pivoting member to pass therethrough.

4. A device characterized substantially in accordance with claim 1, in which said means for urging said rear arm comprises a supporting member securely interposed between said nut and spacer with its bore traversed by said body, and a torsional coiled spring member surrounding said body, one end of said spring member being attached to said vehicle frame and the other end thereof being attached to said rear arm.

5. A device characterized substantially in accordance with claim 4, in which said supporting member is hat-shaped and provided with an annular flange at which the end of said spring member contacts said supporting member.